US012808891B2

(12) United States Patent
Hashimoto et al.

(10) Patent No.: US 12,808,891 B2
(45) Date of Patent: Nov. 24, 2026

(54) AUTOMATIC ANALYZING APPARATUS

(71) Applicant: Canon Kabushiki Kaisha, Tokyo (JP)

(72) Inventors: Shozo Hashimoto, Nasushiobara (JP); Tomohiro Sugimura, Utsunomiya (JP); Masahiro Masubuchi, Yaita (JP); Takashi Goto, Nasushiobara (JP); Yasuo Akizawa, Nasushiobara (JP)

(73) Assignee: Canon Kabushiki Kaisha, Tokyo (JP)

( * ) Notice: Subject to any disclaimer, the term of this patent is extended or adjusted under 35 U.S.C. 154(b) by 477 days.

(21) Appl. No.: 18/415,184

(22) Filed: Jan. 17, 2024

(65) Prior Publication Data

US 2024/0241142 A1 Jul. 18, 2024

(30) Foreign Application Priority Data

Jan. 17, 2023 (JP) ................................ 2023-005218

(51) Int. Cl.
*G01N 35/00* (2006.01)
*G01N 35/02* (2006.01)

(52) U.S. Cl.
CPC . *G01N 35/00693* (2013.01); *G01N 35/00613* (2013.01); *G01N 35/025* (2013.01)

(58) Field of Classification Search
CPC ....... G01N 35/00613; G01N 35/00693; G01N 35/025
See application file for complete search history.

(56) References Cited

U.S. PATENT DOCUMENTS

| | | | |
|---|---|---|---|
| 11,745,185 | B2 | 9/2023 | Tahara et al. |
| 2007/0072299 | A1 | 3/2007 | Orihashi et al. |
| 2022/0244285 | A1 | 8/2022 | Hashimoto et al. |

FOREIGN PATENT DOCUMENTS

| | | | |
|---|---|---|---|
| JP | 2003-315343 | A | 11/2003 |
| JP | 2007-078375 | A | 3/2007 |
| JP | 2017-181116 | A | 10/2017 |
| JP | 2021-004731 | A | 1/2021 |
| JP | 2022-118402 | A | 8/2022 |

OTHER PUBLICATIONS

Office Action issued Sep. 8, 2026, in corresponding Japanese Patent Application No. 2023-005218 with English translation, 10 pages.

*Primary Examiner* — Jennifer Wecker
*Assistant Examiner* — Jonathan Bortoli
(74) *Attorney, Agent, or Firm* — Oblon, McClelland, Maier & Neustadt, L.L.P.

(57) ABSTRACT

According to one embodiment, an automatic analyzing apparatus includes processing circuitry. The processing circuitry carries out a calibration measurement to prepare a calibration curve for a test item, and then carries out an accuracy management measurement to calculate an accuracy of the prepared calibration curve, determines whether or not the calculated accuracy is within an acceptable range, specifies, if the calculated accuracy is within the acceptable range, an analyte for which the test item needs to be recomputed, and recomputes the test item of the specified analyte using the prepared calibration curve.

14 Claims, 7 Drawing Sheets

AUTOMATIC ANALYZING APPARATUS

CROSS-REFERENCE TO RELATED APPLICATIONS

This application is based upon and claims the benefit of priority from Japanese Patent Application No. 2023-005218, filed Jan. 17, 2023, the entire contents of which are incorporated herein by reference.

FIELD

Embodiments described herein relate generally to an automatic analyzing apparatus.

BACKGROUND

Conventionally, in an automatic analyzing apparatus, a function of, upon occurrence of an abnormality in results of an accuracy management measurement (e.g., an accuracy of a calibration curve), automatically carrying out a calibration measurement to prepare a new calibration curve is known. Moreover, a function of performing, after carrying out an automatic calibration, a second accuracy management measurement of the new calibration curve to confirm whether or not the new calibration curve is valid is also known.

In such a conventional automatic analyzing apparatus, however, it has been necessary to put patient measurement (measurement of an analyte) on standby from the first accuracy management measurement to confirmation of the results of the calibration measurement (the accuracy of the new calibration curve). Also, in such a conventional automatic analyzing apparatus, if a measurement of an analyte had been performed prior to a calibration measurement, it has been necessary for the user to manually select the analyte and perform a recheck or the like. Such a conventional automatic analyzing apparatus has not been able to perform a quick measurement of the analyte, thus placing a burden on the user.

DETAILED DESCRIPTION

In general, according to one embodiment, an automatic analyzing apparatus includes processing circuitry. The processing circuitry carries out a calibration measurement to prepare a calibration curve for a test item, and then carries out an accuracy management measurement to calculate an accuracy of the prepared calibration curve, determines whether or not the calculated accuracy is within an acceptable range, specifies, if the calculated accuracy is within the acceptable range, an analyte for which the test item needs to be recomputed, and recomputes the test item of the specified analyte using the prepared calibration curve.

Hereinafter, embodiments of the automatic analyzing apparatus will be described in detail with reference to the drawings.

EMBODIMENTS

Figure 1:
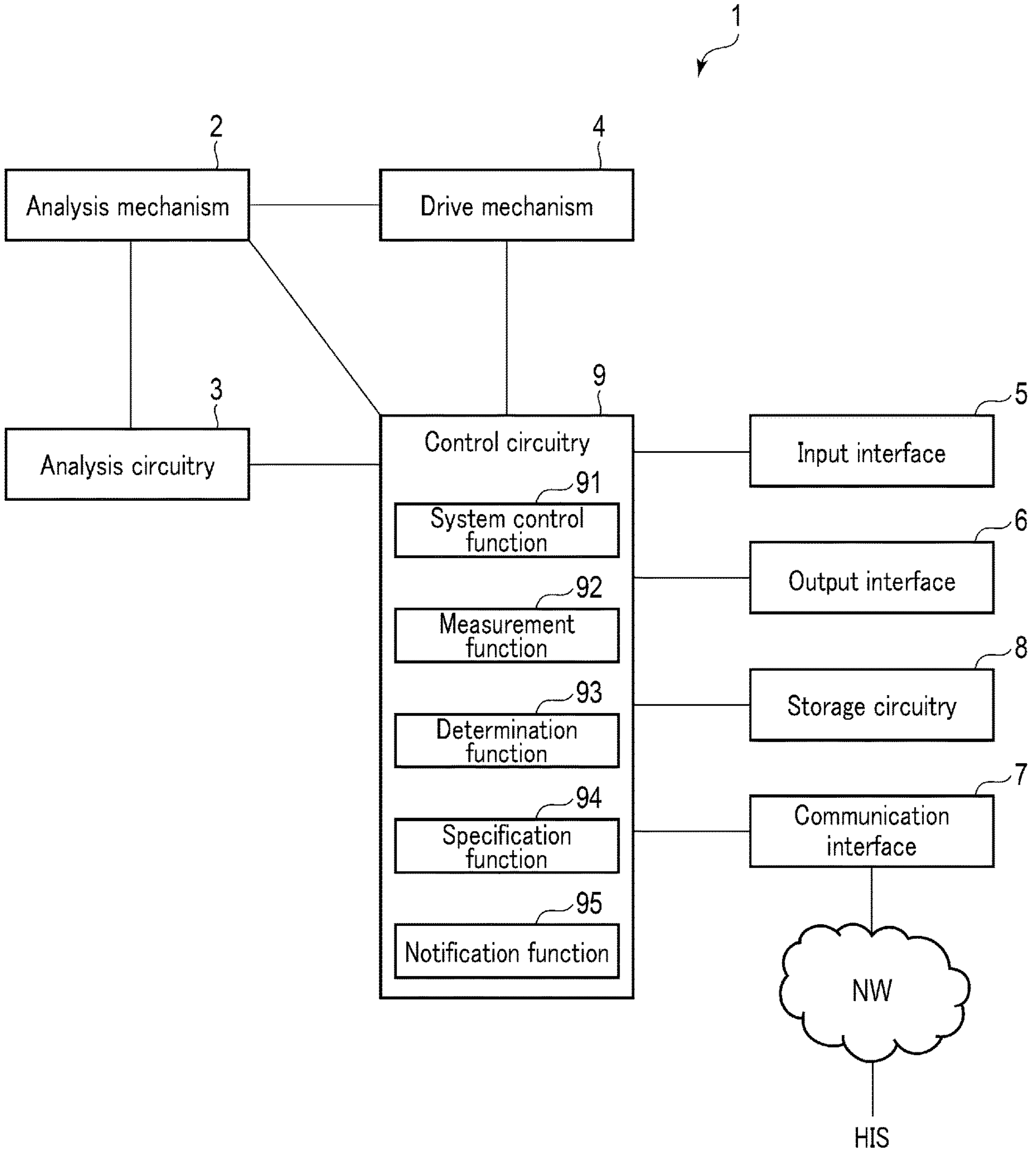
FIG. 1 is a block diagram showing an exemplary functional configuration of an automatic analyzing apparatus according to an embodiment.

FIG. 1 is a block diagram showing an exemplary functional configuration of an automatic analyzing apparatus 1 according to a first embodiment. As shown in FIG. 1, the automatic analyzing apparatus 1 includes an analysis mechanism 2, analysis circuitry 3, a drive mechanism 4, an input interface 5, an output interface 6, a communication interface 7, storage circuitry 8, and control circuitry 9. The communication interface 7 is connected to a hospital information system (HIS) via an in-hospital network NW.

The analysis mechanism 2 mixes a sample, such as a standard sample (which may be called a "calibrator") or a subject sample (which may be called an "analyte"), with a reagent used in each test item set for the sample. The analysis mechanism 2 measures the mixture liquid of the sample and the reagent to generate standard data (calibration signal) and subject data (analysis signal) which may be represented as, for example, an absorbency level. A detailed description of the analysis mechanism 2 will be given later.

The analysis circuitry 3 is a processor configured to analyze the standard data and the subject data, generated by the analysis mechanism 2, to generate data such as calibration data and analysis data. In one example, the analysis circuitry 3 reads an analysis program from the storage circuitry 8 and analyzes the standard data and the subject data according to the read analysis program. More specifically, the analysis circuitry 3 computes concentrations of standard data and subject data using, for example, a calibration curve stored for each test item. Also, the analysis circuitry 3 computes (recomputes) concentrations of the standard data and the subject data using, for example, a new calibration curve (an updated calibration curve). The analysis circuitry 3 may be provided with a storage area for storing at least a part of the data stored in the storage circuitry 8. The analysis circuitry 3 is an example of a computer.

The drive mechanism 4 drives the analysis mechanism 2 under the control of the control circuitry 9. The drive mechanism 4 is realized by, for example, a gear, a stepping motor, a belt conveyor, a lead screw, and so on.

The input interface 5, in one example, accepts settings for analysis parameters, etc., associated with each test item intended for a measurement target sample specified by an operator or requested via the in-hospital network NW. The input interface 5 is realized by, for example, one or more of a mouse, a keyboard, a touch pad or a touch panel on which instructions are input by touching an operation screen, and the like. The input interface 5 is connected to the control circuitry 9 so that it converts operational commands input by an operator into electric signals and outputs them to the control circuitry 9. The input interface 5 is one example of an inputter.

In the disclosure herein, the input interface 5 is not limited to physical operating components such as a mouse and a keyboard. Examples of the input interface 5 also include processing circuitry for electric signals which is adapted to receive an electric signal corresponding to an operational command input from an external input device separate from the automatic analyzing apparatus 1 and to output this electric signal to the control circuitry 9.

The output interface 6 is an interface connected to the control circuitry 9 and outputs signals coming from the control circuitry 9. The output interface 6 is realized by, for example, one or more of display circuitry, print circuitry, an audio device, and the like. The output interface 6 is one example of an outputter.

Examples of the display circuitry here include display devices such as a CRT display, a liquid crystal display, an organic EL display, an LED display, and a plasma display. Also, the display circuitry may include processing circuitry for converting data of a display subject into video signals and supplying the video signals to external entities. Examples of the print circuitry include a printer, etc. The print circuitry may also include output circuitry for supplying data of a print subject to external entities. Examples of the audio device include a speaker, etc. The audio device may also include output circuitry for supplying audio signals to external entities. Note that the output interface 6 and the input interface 5 may be realized together in the form of a touch panel, a touch screen, or the like.

The communication interface 7, in one example, is connected to the in-hospital network NW. The communication interface 7 performs data communication with the HIS via the in-hospital network NW. It is also possible for the communication interface 7 to perform data communication with the HIS via a laboratory information system (LIS) connected to the in-hospital network NW.

The storage circuitry 8 stores one or more analysis programs for the analysis circuitry 3 to execute, and one or more control programs for the control circuitry 9 to realize its functions. The storage circuitry 8 stores, for each test item, calibration data generated by the analysis circuitry 3. The storage circuitry 8 also stores, for each sample, analysis data generated by the analysis circuitry 3. The storage circuitry 8 stores a test order input from an operator, etc., or a test order received by the communication interface 7 via the in-hospital network NW, etc.

The storage circuitry 8 is a memory device for storing various information sets and its examples include a hard disk drive (HDD), a solid state drive (SSD), an integrated circuit, and so on. In addition to, or instead of, an HDD, an SSD, etc., the storage circuitry 8 may be any portable storage medium such as a compact disc (CD), a digital versatile disc (DVD), and a flash memory. Note also that the storage circuitry 8 may also be a drive device adapted to read and write various information sets from and to devices such as a semiconductor memory device represented by a flash memory, a random access memory (RAM), etc. The storage circuitry 8 may be called a "memory".

The storage circuitry 8 stores a program or programs to be executed by the control circuitry 9, various data sets for use in the processes performed by the control circuitry 9, and so on. Such programs may be, for example, installed on a computer from a given network or non-transitory computer-readable storage medium in advance so that the computer will realize each function of the control circuitry 9. In the disclosure herein, various data sets typically include digital data. The storage circuitry 8 is one example of a storage.

The control circuitry 9 is, for example, one or more processors functioning as a center of the automatic analyzing apparatus 1. The control circuitry 9 executes the program stored in the storage circuitry 8 to realize a function corresponding to the executed program. Functions realized by the control circuitry 9 will be described in more detail later. The control circuitry 9 may be provided with a storage area for storing at least a part of the data stored in the storage circuitry 8. The control circuitry 9 may be called a "controller" or "processing circuitry".

An exemplary functional configuration of the automatic analyzing apparatus 1 according to the first embodiment has been described. Next, a configuration of the analysis mechanism 2 will be described in detail.

Figure 2:
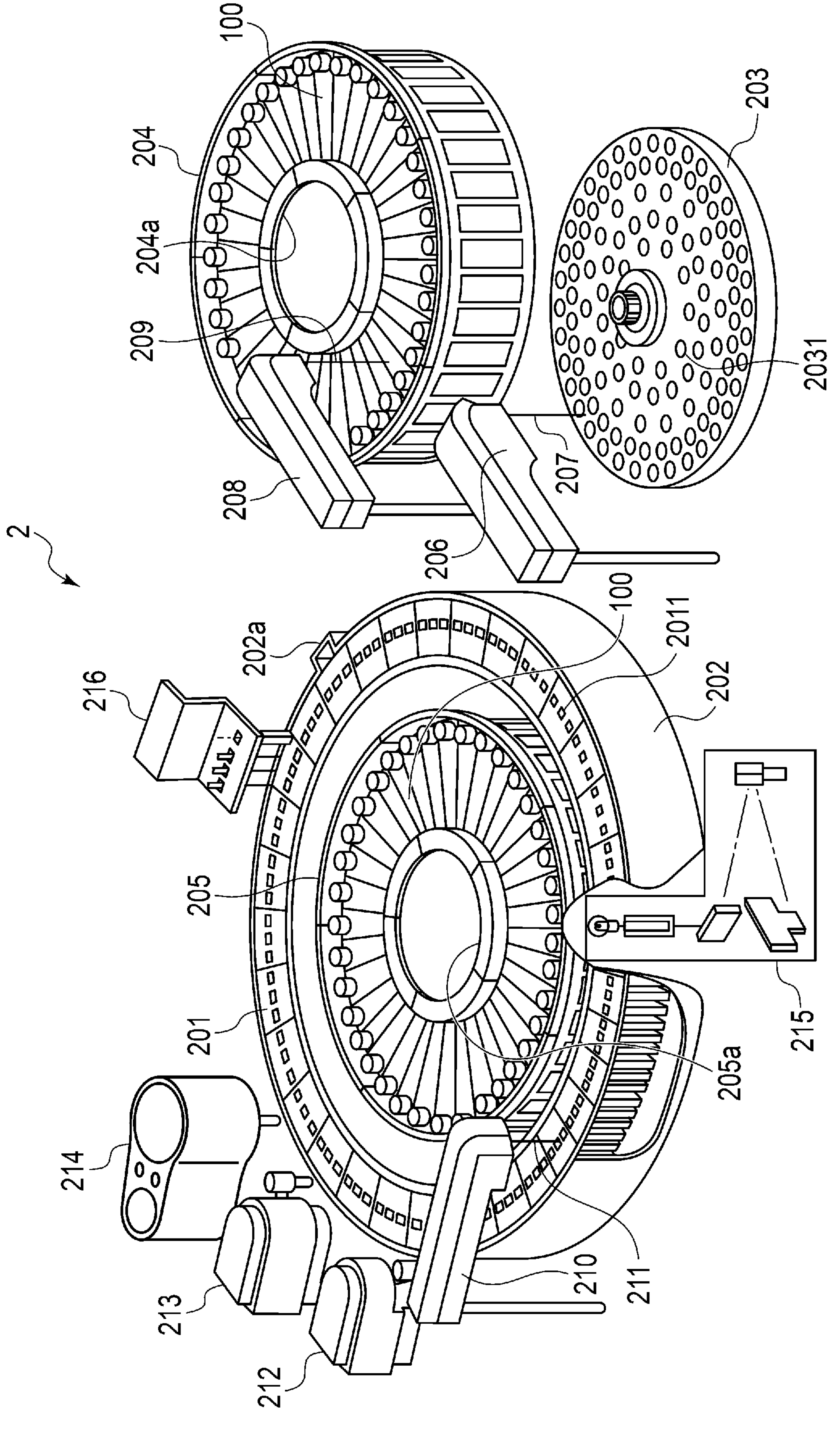
FIG. 2 is a perspective view showing an exemplary component configuration of an analysis mechanism shown in FIG. 1.

FIG. 2 is a perspective view showing an exemplary component configuration of the analysis mechanism 2 shown in FIG. 1. In FIG. 2, the analysis mechanism 2 includes a reaction disk 201, a constant temperature bath 202, a sample disk 203, a first reagent depository 204, and a second reagent depository 205. The analysis mechanism 2 also includes a sample dispensing arm 206, a sample dispensing probe 207, a first reagent dispensing arm 208, a first reagent dispensing probe 209, a second reagent dispensing arm 210, and a second reagent dispensing probe 211. The analysis mechanism 2 further includes a first stirring unit 212, a second stirring unit 213, an electrode unit 214, a photometry unit 215, and a washing unit 216.

First, a description will be given of the reaction disk 201, the constant temperature bath 202, the sample disk 203, the first reagent depository 204, and the second reagent depository 205.

The reaction disk 201 holds multiple reaction containers 2011 in an annular arrangement. The reaction disk 201 conveys these reaction containers 2011 along a predetermined path. As one concrete configuration, the reaction disk 201 is turned and stopped in an alternating manner during a test procedure, and this alternating motion may be repeated at regular time intervals (hereinafter, each time interval will be called "one cycle"). Each reaction container 2011 may be formed of, for example, a glass material, a polypropylene (PP) material, or an acrylic material. Each reaction container 2011 may be called a "reaction tube" or a "cell". Also, the motion of the reaction disk 201 during a test procedure may be called a "cycle motion".

The constant temperature bath 202 stores water (constant temperature water) kept at a predetermined temperature (normally, 37° C.). In one example, such constant temperature water contains an additive for anti-bacterial purposes. In the constant temperature bath 202, the reaction containers 2011 are immersed in the stored constant temperature water so that the temperature of a liquid (a mixture liquid) contained in each reaction container 2011 is warmed and kept constant. Note that there may be a protrusion 202*a* formed at the outer circumference of the constant temperature bath 202 and this protrusion 202*a* permits direct access to the constant temperature water through the use of a dispensing probe, etc.

The sample disk 203 is provided near the reaction disk 201. The sample disk 203 holds, in an annular arrangement, multiple sample containers 2031 each containing a sample such as blood. The sample disk 203 is rotated to move the sample container 2031 that contains a dispensing target sample to a sample aspirating position.

The first reagent depository 204 is adapted for cold storage of multiple reagent containers 100 containing a first reagent for reaction with a given component in standard samples and subject samples. While not illustrated in FIG. 2, the first reagent depository 204 may be covered by a detachable reagent cover. The first reagent depository 204 encloses reagent racks 204*a* in such a manner that the reagent racks 204*a* can turn. These reagent racks 204*a* also hold the multiple reagent containers 100 in an annular arrangement. The reagent racks 204*a* are turned by the drive mechanism 4.

The second reagent depository 205 is adapted for cold storage of, for example, reagent containers 100 that contain a second reagent constituting a dual-reagent system with the first reagent. While not illustrated in FIG. 2, the second reagent depository 205 may be covered by a detachable reagent cover. The second reagent depository 205 encloses reagent racks 205*a* in such a manner that the reagent racks 205*a* can turn. These reagent racks 205*a* also hold the multiple reagent containers 100 in an annular arrangement. The reagent racks 205*a* are turned by the drive mechanism 4. Note that the second reagent kept at low temperature in the second reagent depository 205 may be a reagent of the same components and the same concentration as the first reagent kept at low temperature in the first reagent depository 204.

Next, the sample dispensing arm 206, the sample dispensing probe 207, the first reagent dispensing arm 208, the first reagent dispensing probe 209, the second reagent dispensing arm 210, and the second reagent dispensing probe 211 will be described.

In one example, the sample dispensing arm 206 is provided between the reaction disk 201 and the sample disk 203. The sample dispensing arm 206 is driven by the drive mechanism 4 so that it can vertically ascend and descend and also horizontally rotate. The sample dispensing arm 206 carries the sample dispensing probe 207 at its one end.

In one example, the sample dispensing probe 207 is driven by the drive mechanism 4 so that it aspirates a sample from the sample container 2031 held by the sample disk 203. Also, the sample dispensing probe 207 in one example is driven by the drive mechanism 4 so that it discharges the aspirated sample to the reaction container 2011 held by the reaction disk 201. Here, the position where the reaction container 2011 is placed for receiving the discharged sample may be called a “sample discharging position”. The sample discharging position is set on the circling trajectory of the sample dispensing probe 207.

In one example, the first reagent dispensing arm 208 is provided between the reaction disk 201 and the first reagent depository 204. The first reagent dispensing arm 208 is driven by the drive mechanism 4 so that it can vertically ascend and descend and also horizontally rotate. The first reagent dispensing arm 208 carries the first reagent dispensing probe 209 at its one end.

In one example, the first reagent dispensing probe 209 is driven by the drive mechanism 4 so that it aspirates the first reagent from the reagent container 100 held by the first reagent depository 204. Also, the first reagent dispensing probe 209 in one example is driven by the drive mechanism 4 so that it discharges the aspirated first reagent to the reaction container 2011 held by the reaction disk 201. Here, the position where the reaction container 2011 is placed for receiving the discharged first reagent may be called a “first reagent discharging position”. The first reagent discharging position is set on the circling trajectory of the first reagent dispensing probe 209.

In one example, the second reagent dispensing arm 210 is provided near the outer periphery of the reaction disk 201. The second reagent dispensing arm 210 is driven by the drive mechanism 4 so that it can vertically ascend and descend and also horizontally rotate. The second reagent dispensing arm 210 carries the second reagent dispensing probe 211 at its one end.

In one example, the second reagent dispensing probe 211 is driven by the drive mechanism 4 so that it aspirates the second reagent from the reagent container 100 held by the second reagent depository 205. Also, the second reagent dispensing probe 211 in one example is driven by the drive mechanism 4 so that it discharges the aspirated second reagent to the reaction container 2011 held by the reaction disk 201. Here, the position where the reaction container 2011 is placed for receiving the discharged second reagent may be called a “second reagent discharging position”. The second reagent discharging position is set on the circling trajectory of the second reagent dispensing probe 211.

Next, the first stirring unit 212, the second stirring unit 213, the electrode unit 214, the photometry unit 215, and the washing unit 216 will be described.

In one example, the first stirring unit 212 is provided near the outer periphery of the reaction disk 201. The first stirring unit 212 includes a first stirring arm and a first stirring tool. The first stirring arm is driven by the drive mechanism 4 so that it can vertically ascend and descend and also horizontally rotate. The first stirring tool is provided at one end of the first stirring arm. In one example, the first stirring tool is driven by the drive mechanism 4 so that it stirs the mixture liquid of the sample and the first reagent contained in the reaction container 2011 on the reaction disk 201.

In one example, the second stirring unit 213 is provided near the outer periphery of the reaction disk 201. The second stirring unit 213 includes a second stirring arm and a second stirring tool. The second stirring arm is driven by the drive mechanism 4 so that it can vertically ascend and descend and also horizontally rotate. The second stirring tool is provided at one end of the second stirring arm. In one example, the second stirring tool is driven by the drive mechanism 4 so that it stirs the mixture liquid of the sample, the first reagent, and the second reagent contained in the reaction container 2011 on the reaction disk 201.

In one example, the electrode unit 214 is provided near the outer periphery of the reaction disk 201. The electrode unit 214 measures the electrolyte concentration of the mixture liquid discharged into the reaction container 2011. The electrode unit 214 includes an ion selective electrode (ISE) and a reference electrode. Under the control of the control circuitry 9, the electrode unit 214 measures the electrical potential between the ISE and the reference electrode for the mixture liquid containing measurement target ions. The electrode unit 214 outputs data on the measured electrical potential, which serves as either the standard data or the subject data, to the analysis circuitry 3.

In one example, the photometry unit 215 may be provided at a desired position between the inner circumference and the outer circumference of the reaction disk 201. The photometry unit 215 optically measures given components in the mixture liquid discharged into the reaction container 2011. The photometry unit 215 includes a light source and a photodetector. In one example, the light source is provided on the inner circumference side of the reaction disk 201, and the photodetector is provided on the outer circumference side of the reaction disk 201. The light source emits light under the control of the control circuitry 9. The emitted light enters the reaction container 2011 through a first sidewall and exits the reaction container 2011 through a second sidewall opposite the first sidewall. The photodetector detects the light coming out of the reaction container 2011.

More specifically, the photodetector in one example detects light that has passed through the mixture liquid of a standard sample and a reagent in the reaction container 2011, and generates standard data represented as an absorbency level, etc., based on the intensity of the detected light. In one example, the photodetector also detects light that has passed through the mixture liquid of a subject sample and a reagent in the reaction container 2011, and generates subject data represented as an absorbency level, etc., based on the intensity of the detected light. The photometry unit 215 outputs the generated standard data and subject data to the analysis circuitry 3.

In one example, the washing unit 216 is provided near the outer periphery of the reaction disk 201. The washing unit 216 washes the inside of each reaction container 2011 for which the measurement of the mixture liquid by the electrode unit 214 or the photometry unit 215 has been finished. In one example, the washing unit 216 includes a detergent bottle (not illustrated) adapted to retain a detergent for washing the reaction containers 2011, a washing liquid preparing mechanism for preparing a washing liquid of a given concentration by adjusting a supplied amount of the detergent using an electromagnetic valve, etc., and a washing liquid supply pump (not illustrated) for supplying the prepared washing liquid. The washing unit 216 also includes a washing nozzle (not illustrated) for discharging the washing liquid supplied by the washing liquid supply pump into the reaction container 2011 and for suctioning the mixture liquid and the washing liquid remaining in the reaction container 2011.

The washing liquid supplied from the washing unit 216 is prepared by, for example, diluting a high-concentration detergent to a predetermined concentration. Examples of the available types of the detergent include an acid detergent and an alkaline detergent.

Exemplary configurations of the analysis mechanism 2 of the automatic analyzing apparatus 1 according to the embodiment have been described. Next, functions realized by the control circuitry 9 of the automatic analyzing apparatus 1 according to the embodiment will be described in detail.

The control circuitry 9 runs the program or programs read from the storage circuitry 8 to realize a system control function 91, a measurement function 92, a determination function 93, a specification function 94, and a notification function 95. In other words, the control circuitry 9 has the system control function 91, the measurement function 92, the determination function 93, the specification function 94, and the notification function 95. Note that the description of the present embodiment will assume that each function is realized by a single processor, but this does not intend a limitation. For example, multiple independent processors may be combined to form the control circuitry and each function may be realized by having the respective processors run the programs. Also, the system control function 91, the measurement function 92, the determination function 93, the specification function 94, and the notification function 95 may be called a system control circuit, a measurement circuit, a determination circuit, a specification circuit, and a notification circuit, respectively, and they may be implemented as individual hardware circuits. These explanations of the functions of the control circuitry 9 will also apply to the subsequent embodiments as well.

The term "processor" used by the disclosure herein refers to, for example, a central processing unit (CPU) or a graphics processing unit (GPU), or any of the various types of circuitry members including an application specific integrated circuit (ASIC), a programmable logic device such as a simple programmable logic device (SPLD), a complex programmable logic device (CPLD), or a field programmable gate array (FPGA), and so on. The processor reads the program or programs stored in the storage circuitry 8 and executes them to realize the corresponding functions.

Note that the programs may be incorporated directly within circuitry of the processor, instead of being stored in the storage circuitry 8. According to such architecture, the processor reads the programs incorporated in its circuits and executes them to realize the functions. Each processor in the present embodiment is not limited to a single circuitry-type processor, and multiple independent circuits may be combined and integrated as a single processor to realize the intended functions. Furthermore, multiple components or features as given in FIG. 1 may be integrated as one processor to realize the respective functions. These explanations of the "processor" will also apply to the subsequent embodiments and their modifications as well.

The control circuitry 9 with the system control function 91 takes total control over the components of the automatic analyzing apparatus 1 according to input information input via the input interface 5. In one example, the control circuitry 9 with the system control function 91 controls the drive mechanism 4 so that measurement operations are conducted according to test items, and controls the analysis circuitry 3 to analyze the standard data and the subject data generated by the analysis mechanism 2. More specifically, the control circuitry 9 controls the rotation of the reaction disk 201, the pivoting and dispensing action of the sample dispensing probe 207, the pivoting and dispensing action of the first reagent dispensing probe 209, and the pivoting and dispensing action of the second reagent dispensing probe 211. The control circuitry 9 also controls the operations of the first stirring unit 212, the second stirring unit 213, the electrode unit 214, the photometry unit 215, and the washing unit 216. The control circuitry 9 that realizes the system control function 91 is one example of a system controller.

The measurement function 92 is a function of conducting a calibration measurement, an accuracy management measurement, and the like. In one example, a calibration measurement is performed to prepare a new calibration curve for a test item. The control circuitry 9 with the measurement function 92 carries out a calibration measurement in response to an accuracy decrease in the calibration curve, an expiration of the calibration curve, or a lot change in the reagent, the standard sample, and the like. In one example, the accuracy management measurement is performed to calculate an accuracy of the calibration curve. The control circuitry 9 with the measurement function 92 calculates an accuracy of a known calibration curve (e.g., the calibration curve stored in the storage circuitry 8) or a calibration curve prepared by the calibration measurement. The control circuitry 9 that realizes the measurement function 92 is one example of a measurer.

The determination function 93 is a function of performing various determinations. More specifically, the control circuitry 9 with the determination function 93 determines whether or not an accuracy of the calibration curve is within an acceptable range. The control circuitry 9 also determines whether or not settings regarding automatic measurement (e.g., automatic calibration, automatic accuracy management, automatic recomputation, and automatic reagent handover) set by the user are valid. The control circuitry 9 also determines whether or not an execution command for each measurement has been made by the user. The control circuitry 9 also determines whether or not each measurement can be conducted. The control circuitry 9 that realizes the determination function 93 is one example of a determiner.

The specification function 94 is a function of specifying an analyte for which recomputation needs to be performed, or an analyte that needs to be retested. Here, the analyte to be specified is an analyte during, for example, a period from a start of a test to preparation of a calibration curve by calibration measurement. In other words, the analyte to be specified is an analyte for which a test item has been computed with a calibration curve previous to a calibration curve prepared by the calibration measurement. More specifically, the control circuitry 9 with the specification function 94 specifies an analyte for which recomputation needs to be performed or an analyte that needs to be retested. The control circuitry 9 that realizes the specification function 94 is one example of a specifier.

The notification function 95 is a function of notifying a user of the determination result, the state of the apparatus, and the like. More specifically, the control circuitry 9 with the notification function 95 performs user notification by, for example, controlling a display to present information on the determination result, the state of the apparatus, and the like. The control circuitry 9 may also perform notification as to whether or not to adopt the recomputed result. The control circuitry 9 that realizes the notification function 95 is one example of a notifier.

An exemplary configuration of the control circuitry 9 in the automatic analyzing apparatus 1 according to the first embodiment has been described. Next, operations of the automatic analyzing apparatus 1 according to the first embodiment will be described with reference to the flowchart in FIG. 3.

Figure 3:
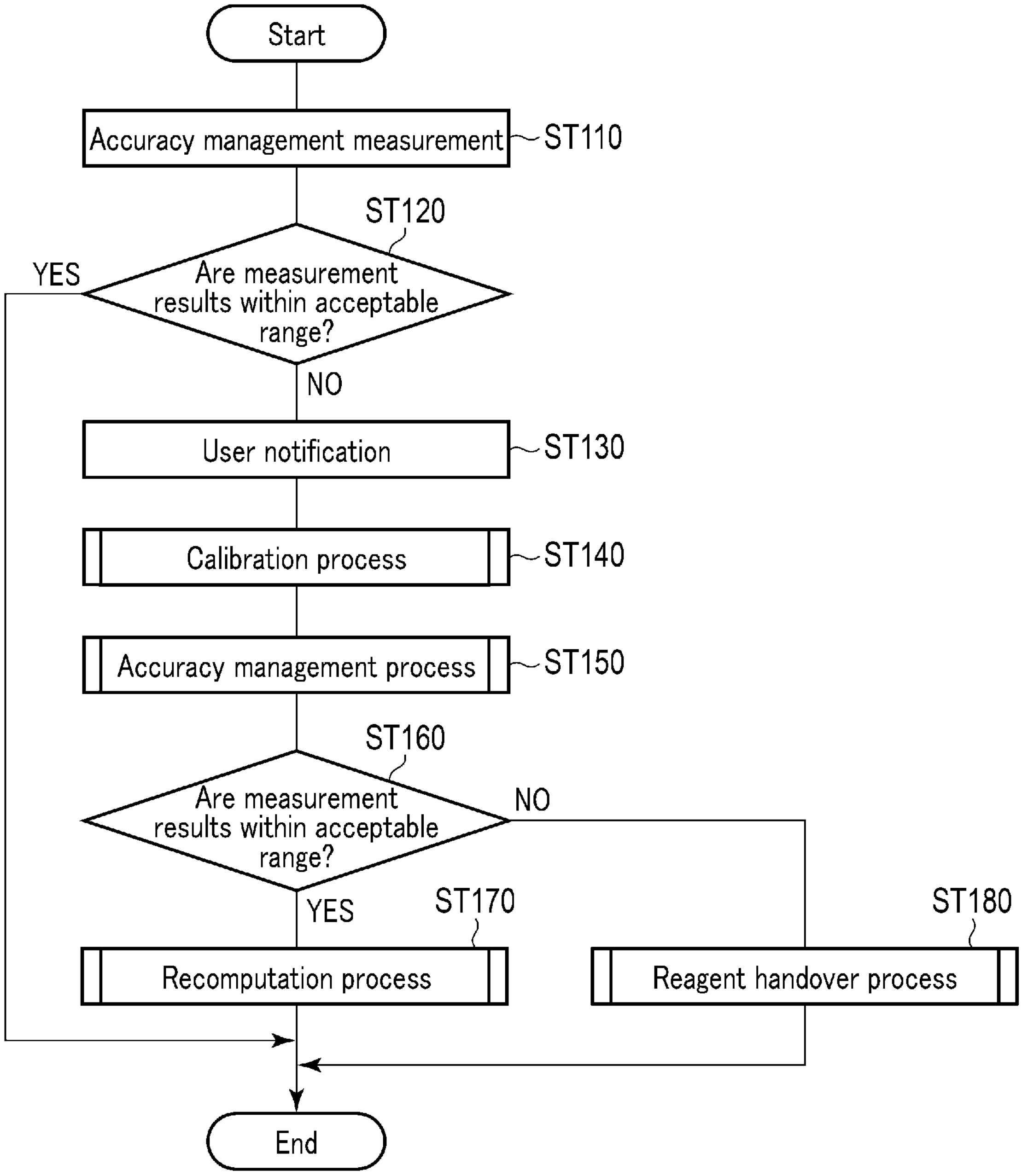
FIG. 3 is a flowchart showing exemplary processing steps in an automatic checking process performed by the automatic analyzing apparatus according to the embodiment.

FIG. 3 is a flowchart showing exemplary processing steps in an automatic checking process performed by the automatic analyzing apparatus 1 according to the embodiment. In one example, the automatic checking process is a process of automatically performing an accuracy management measurement as daily maintenance and inspection, and various processes performed according to the measurement results. Examples of the various processes include a calibration process, an accuracy management process, a recomputation process, and a reagent handover process.

In one example, the automatic checking process shown in FIG. 3 is performed at the start of measurement of the analyte. It has conventionally been necessary to wait for the results of the accuracy management measurement before measurement of the analyte is started. On the other hand, in the automatic checking process according to the embodiment, it is possible to perform measurement of the analyte without waiting for the results of the accuracy management measurement, for example, in parallel with the accuracy management measurement. Note that flowcharts to be referred to in the description given below relate to a single test item.

(Step ST110)

Upon a start of an automatic checking process, the control circuitry 9 with the measurement function 92 carries out an accuracy management measurement for the stored calibration curve. Here, the automatic analyzing apparatus 1 may perform measurement of the analyte in parallel therewith. After carrying out the accuracy management measurement, the control circuitry 9 outputs measurement results regarding the stored calibration curve. It will be assumed that measurement of the analyte is performed in parallel at the start of the automatic checking process.

(Step ST120)

After outputting the measurement results, the control circuitry 9 with the determination function 93 determines whether or not the measurement results are within an acceptable range. In one example, the measurement results represent an accuracy of the stored calibration curve in percentages. The acceptable range is, for example, a range of values in percentages. Note that the acceptable range may be set by the user in advance. If it is determined that the measurement results are in the acceptable range, the process in the flowchart is terminated. If it is determined that the measurement results are outside the acceptable range, the process in the flowchart proceeds to step ST130.

If the measurement results are outside the acceptable range, it is suspected that the state of the reagent has been changed. The change in the state of the reagent is caused by, for example, one or more of vaporization of the reagent, inflow of condensation water, and contamination.

(Step ST130)

After determining that the measurement results are outside the acceptable range, the control circuitry 9 with the notification function 95 notifies the user of information regarding the measurement results as a user notification. More specifically, the control circuitry 9 reports an abnormality of the measurement results to the user.

(Step ST140)

After reporting the abnormality of the measurement results to the user, the control circuitry 9 carries out a calibration process. The calibration process is a process regarding a calibration measurement. A concrete example of the calibration process will be described with reference to FIG. 4.

Figure 4:
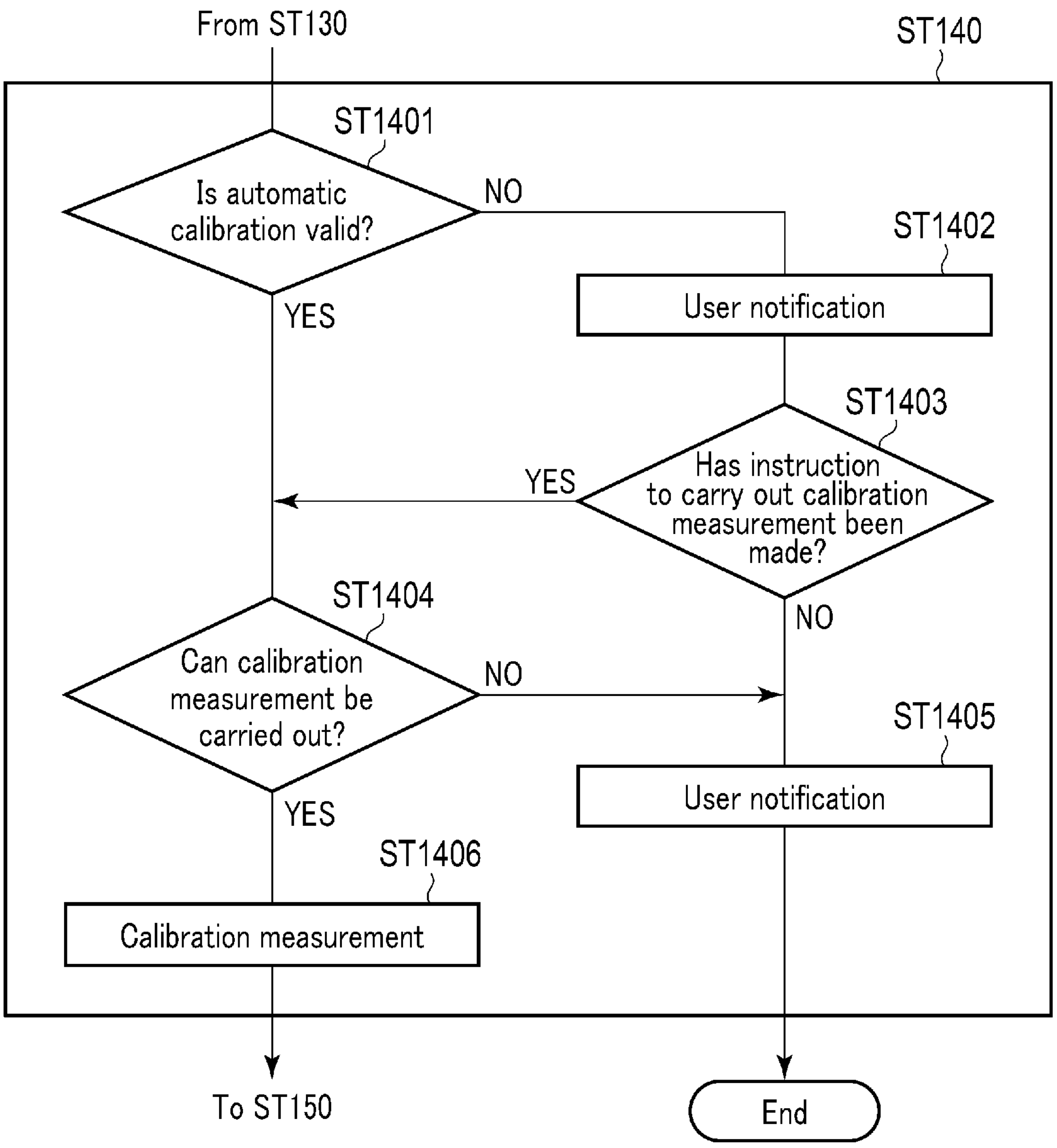
FIG. 4 is a flowchart showing exemplary processing steps in the calibration process included in the flowchart in FIG. 3.

FIG. 4 is a flowchart showing exemplary processing steps in the calibration process included in the flowchart in FIG. 3. The flowchart of FIG. 4 is started after a shift is made from step ST130 in the flowchart of FIG. 3.

(Step ST1401)

Upon carrying out the calibration process, the control circuitry 9 with the determination function 93 determines whether or not automatic calibration is valid. It is assumed that the settings regarding the automatic calibration have been performed by the user in advance. If it is determined that the automatic calibration is valid, the process proceeds to step ST1404. If it is determined that the automatic calibration is not valid, the process proceeds to step ST1402.

(Step ST1402)

After determining that the automatic calibration is not valid, the control circuitry 9 with the notification function 95 inquires of the user as a user notification whether or not to carry out a calibration measurement. Here, the user gives an instruction as to whether or not to carry out the calibration measurement via, for example, the input interface 5.

(Step ST1403)

After the user notification, the control circuitry 9 with the determination function 93 determines whether or not an instruction to carry out a calibration measurement has been made. If it is determined that an instruction to carry out a calibration measurement has been made, the process proceeds to step ST1404. If it is determined that an instruction to carry out a calibration measurement has not been made, the process proceeds to step ST1405.

(Step ST1404)

After determining at step ST1401 that the automatic calibration is valid, or after determining at step ST1403 that an instruction to carry out a calibration measurement has been made, the control circuitry 9 with the determination function 93 determines whether or not a calibration measurement can be carried out. In this determination, a check is made as to, for example, whether or not a reagent and a standard sample (calibrator) necessary for the calibration measurement are equipped. If it is determined that a calibration measurement can be carried out, the process proceeds to step ST1406. If it is determined that a calibration measurement cannot be carried out, the process proceeds to step ST1405.

(Step ST1405)

After determining at step ST1403 that an instruction to carry out a calibration measurement has not been made, the control circuitry 9 with the notification function 95 makes a user notification that a calibration measurement is not to be carried out. Here, the control circuitry 9 may make a notification that the accuracy is not insured with the current calibration curve, or may inquire of the user whether or not to continue the test with the current calibration curve.

After determining at step ST1404 that a calibration measurement cannot be carried out, the control circuitry 9 with the notification function 95 makes a user notification that a calibration measurement cannot be carried out. Here, the control circuitry 9 may make a notification that a reagent and a sample are insufficient for a calibration measurement, make a notification that the accuracy cannot be insured with the current calibration curve, or may inquire of the user whether or not to continue the test with the current calibration curve. Upon completing step ST1405, the automatic checking process is terminated.

(Step ST1406)

After determining at step ST1404 that a calibration measurement can be carried out, the control circuitry 9 with the measurement function 92 carries out a calibration measurement. After carrying out the calibration measurement, the control circuitry 9 generates a new calibration curve. After step ST1406, the process proceeds to step ST150.

(Step ST150)

After carrying out the calibration measurement at ST1406, the control circuitry 9 carries out an accuracy management process. The accuracy management process is a process regarding an accuracy management measurement. A concrete example of the accuracy management process will be described with reference to FIG. 5.

Figure 5:
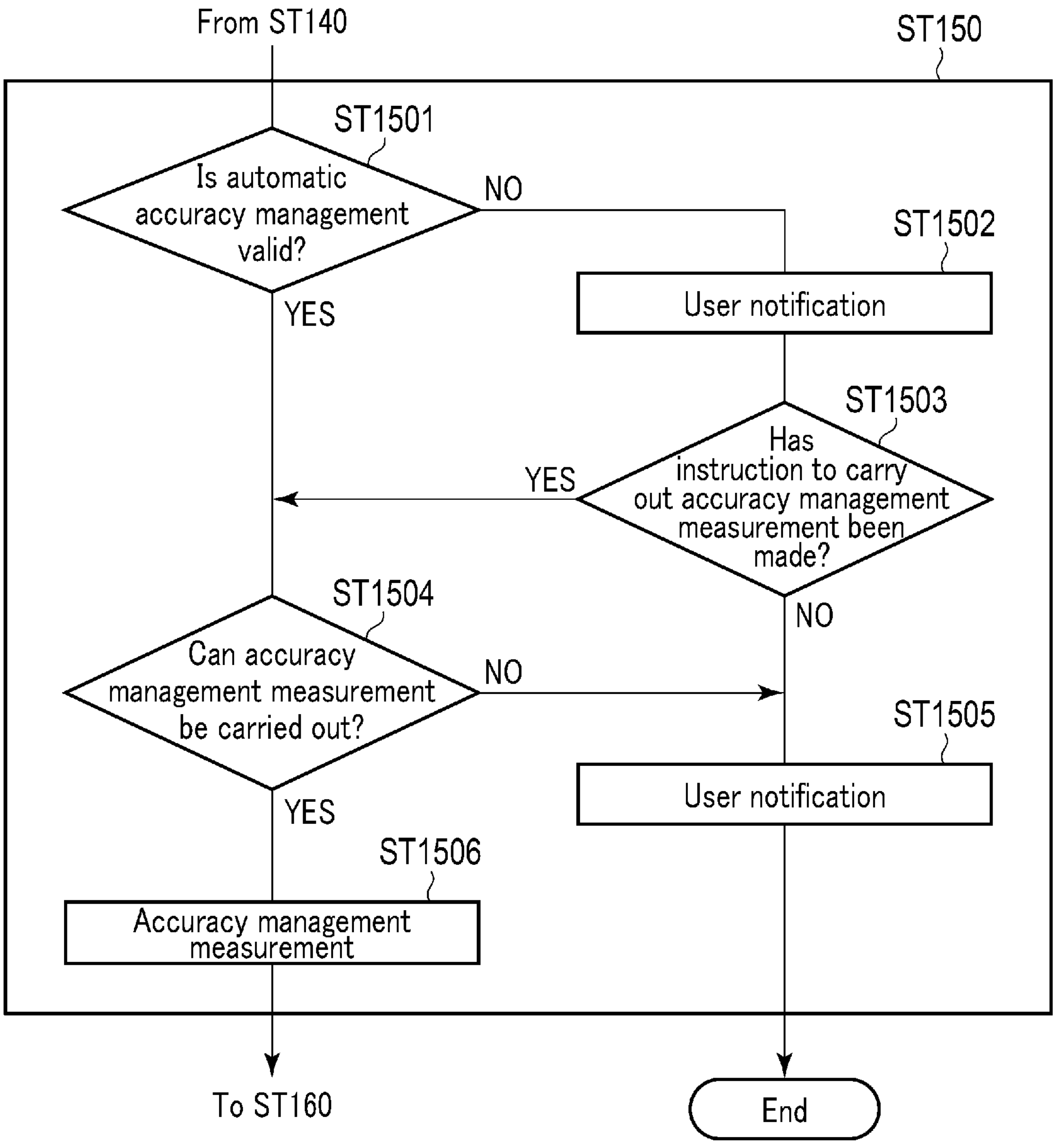
FIG. 5 is a flowchart showing exemplary processing steps in the accuracy management process included in the flowchart in FIG. 3.

FIG. 5 is a flowchart showing exemplary processing steps in the accuracy management process included in the flowchart in FIG. 3. The flowchart of FIG. 5 is started after a shift is made from step ST140 in the flowchart of FIG. 3 (step ST1406 in the flowchart of FIG. 4).

(Step ST1501)

Upon carrying out the accuracy management process, the control circuitry 9 with the determination function 93 determines whether or not automatic accuracy management is valid. It is assumed that the settings regarding the automatic accuracy management have been performed by the user in advance. If it is determined that the automatic accuracy management is valid, the process proceeds to step ST1504. If it is determined that the automatic accuracy management is not valid, the process proceeds to step ST1502.

(Step ST1502)

After determining that the automatic accuracy management is not valid, the control circuitry 9 with the notification function 95 inquires of the user as a user notification whether or not to carry out an accuracy management measurement. Here, the user gives an instruction as to whether or not to carry out the calibration measurement via, for example, the input interface 5.

(Step ST1503)

After the user notification, the control circuitry 9 with the determination function 93 determines whether or not an instruction to carry out an accuracy management measurement has been made. If it is determined that an instruction to carry out an accuracy management measurement has been made, the process proceeds to step ST1504. If it is determined that an instruction to carry out an accuracy management measurement has not been made, the process proceeds to step ST1505.

Note that the process at step ST1503 may be integrated with the process at step ST1403. For example, an instruction to carry out an accuracy management measurement at step ST1503 may be assumed to have been made by an instruction to carry out a calibration measurement at step ST1403. This means, for example, that the processing from step ST1501 to step ST1503 may be omitted.

(Step ST1504)

After determining at step ST1501 that the automatic accuracy management is valid, or after determining at step ST1503 that an instruction to carry out an accuracy management measurement has been made, the control circuitry 9 with the determination function 93 determines whether or not an accuracy management measurement can be carried out. In this determination, a check is made as to, for example, whether or not a reagent and a standard sample necessary for the accuracy management measurement (control sample) are equipped. If it is determined that an accuracy management measurement can be carried out, the process proceeds to step ST1506. If it is determined that an accuracy management measurement cannot be carried out, the process proceeds to step ST1505.

(Step ST1505)

After determining at step ST1503 that an instruction to carry out an accuracy management measurement has not been made, the control circuitry 9 with the notification function 95 makes a user notification that an accuracy management measurement is not to be carried out. Here, the control circuitry 9 may make a notification that the accuracy is not insured with the current calibration curve, or may inquire of the user whether or not to continue the test with the current calibration curve.

Also, after determining at step ST1504 that the accuracy management measurement cannot be carried out, the control circuitry 9 with the notification function 95 makes a user notification that an accuracy management measurement cannot be carried out. Here, the control circuitry 9 may make a notification that a reagent and a sample are insufficient for an accuracy management measurement, may make a notification that the accuracy cannot be insured with the current calibration curve, or may inquire of the user whether or not to continue the test with the current calibration curve. Upon completing step ST1505, the automatic checking process is terminated.

(Step ST1506)

After determining at step ST1504 that an accuracy management measurement can be carried out, the control circuitry 9 with the measurement function 92 carries out an accuracy management measurement for a new calibration curve prepared at step ST1406. After carrying out the accuracy management measurement, the control circuitry 9 outputs measurement results regarding the accuracy of the new calibration curve. After step ST1506, the process proceeds to step ST160.

(Step ST160)

After outputting the measurement results at step ST1506, the control circuitry 9 with the determination function 93 determines whether or not the measurement results are within an acceptable range. In one example, the measurement results represent an accuracy of the new calibration curve in percentages. The acceptable range is, for example, a range of values in percentages, and may be set in the same manner as the above-described step ST120. If it is determined that the measurement results are within the acceptable range, the process proceeds to step ST170. If it is determined that the measurement results are outside the acceptable range, the process proceeds to step ST180.

(Step ST170)

After determining that the measurement results are within the acceptable range, the control circuitry 9 may carry out a recomputation process. The recomputation process is a process regarding recomputation using a new calibration curve. A concrete example of the recomputation process will be described with reference to FIG. 6.

Figure 6:
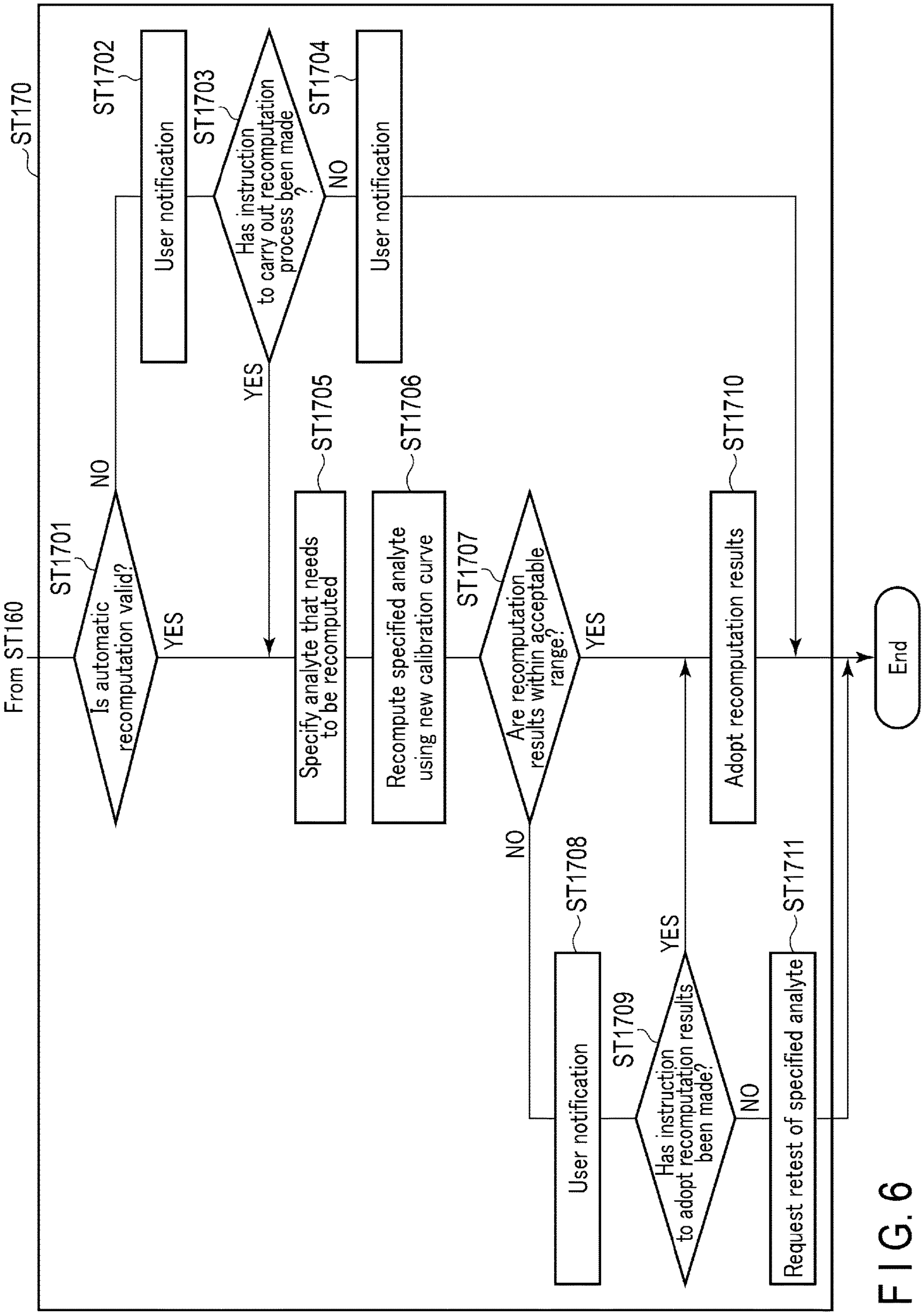
FIG. 6 is a flowchart showing exemplary processing steps in the recomputation process included in the flowchart in FIG. 3.

FIG. 6 is a flowchart showing exemplary processing steps in the recomputation process included in the flowchart in FIG. 3. The flowchart of FIG. 6 is started after it is determined at step ST160 in the flowchart of FIG. 3 that the measurement results are within the acceptable range.

(Step ST1701)

Upon carrying out the recomputation process, the control circuitry 9 with the determination function 93 determines whether or not automatic recomputation is valid. It is assumed that the settings regarding the automatic recomputation have been performed by the user in advance. If it is determined that the automatic recomputation is valid, the process proceeds to step ST1705. If it is determined that the automatic recomputation is not valid, the process proceeds to step ST1702.

(Step ST1702)

After determining that the automatic recomputation is not valid, the control circuitry 9 with the notification function 95 inquires of the user as a user notification whether or not to carry out a recomputation process. Here, the user gives an instruction as to whether or not to carry out the calibration measurement via, for example, the input interface 5.

(Step ST1703)

After the user notification, the control circuitry 9 with the determination function 93 determines whether or not an instruction to carry out a recomputation process has been made. If it is determined that an instruction to carry out a recomputation process has been made, the process proceeds to step ST1705. If it is determined that an instruction to carry out a recomputation process has not been made, the process proceeds to step ST1704.

(Step ST1704)

After determining that an instruction to carry out a recomputation process has not been made, the control circuitry 9 with the notification function 95 makes a user notification that a recomputation process is not to be performed. Here, the control circuitry 9 may make a notification that the accuracy cannot be insured with the current calibration curve, or may inquire of the user whether or not to continue the test with the current calibration curve. Upon completing step ST1704, the automatic checking process is terminated.

(Step ST1705)

After determining at step ST1701 that the automatic recomputation is valid, or after determining at step ST1703 that an instruction to carry out a recomputation process has been made, the control circuitry 9 with the specification function 94 specifies an analyte for which recomputation needs to be performed. In other words, if the measurement results (an accuracy of the prepared calibration curve) are within the acceptable range, the control circuitry 9 specifies an analyte for which a test item needs to be recomputed. Specifically, the control circuitry 9 specifies an analyte for which computation has been performed with a calibration curve that has not yet been updated by the calibration process (i.e., a calibration curve stored prior to the calibration process) during a period from a start of the automatic checking process until the present time.

(Step ST1706)

After specifying the analyte, the control circuitry 9 outputs subject data on the specified analyte to the analysis circuitry 3. The analysis circuitry 3 performs recomputation for the specified analyte using a new calibration curve. The analysis circuitry 3 outputs the recomputation results to the control circuitry 9.

(Step ST1707)

After the recomputation for the specified analyte is performed, the control circuitry 9 with the determination function 93 determines whether or not the recomputation results are within the acceptable range. In this determination, a check is made as to, for example, whether or not the recomputation results are within an acceptable range based on the computation results prior to the recomputation, the recomputation results, and acceptable errors, namely, whether or not the recomputation results are to be adopted. More specifically, if errors between the recomputation results and the computation results are within a range of acceptable errors, the control circuitry 9 performs determination to adopt the recomputation results. Also, the control circuitry 9 with the notification function 95 may notify the user of information as to whether or not an error is within an acceptable range.

If it is determined that the recomputation results are within the acceptable range, namely, that the recomputation results are to be adopted, the process proceeds to step ST1710. If it is determined that the recomputation results are outside the acceptable range, namely, that the recomputation results are not to be adopted, the process proceeds to step ST1708.

(Step ST1708)

Upon determining that the recomputation results are outside the acceptable range (if it is determined that the recomputation results are not to be adopted), the control circuitry 9 with the notification function 95 inquires of the user as a user notification whether or not to adopt the recomputation results. Here, the user gives an instruction as to whether or not to adopt the recomputation results via, for example, the input interface 5.

(Step ST1709)

After the user notification, the control circuitry 9 with the determination function 93 determines whether or not an instruction to adopt the recomputation results has been made. If it is determined that an instruction to adopt the recomputation results has been made, the process proceeds to step ST1710. If it is determined that an instruction to adopt the recomputation results has not been made, the process proceeds to step ST1711.

(Step ST1710)

If it is determined at step ST1707 that the recomputation results are within the acceptable range, namely, if it is determined that the recomputation results are to be adopted, or if it is determined at step ST1709 that an instruction to adopt the recomputation results has been made, the control circuitry 9 adopts the recomputation results. Upon completing step ST1710, the automatic checking process is terminated.

(Step ST1711)

After determining at step ST1709 that an instruction to adopt the recomputation results has not been made, the control circuitry 9 requests a retest of the specified analyte. Upon completing step ST1711, the automatic checking process is terminated.

(Step ST180)

After determining at step ST160 that the measurement results are outside the acceptable range, the control circuitry 9 carries out a reagent handover process. The reagent handover process is a process of determining whether or not a handover reagent exists, and requesting a retest using a new reagent. The reason for performing the reagent handover process is that a problem may possibly be occurring in the reagent, since, even though a new calibration curve has been prepared at step ST140, the accuracy of the new calibration curve is not within the acceptable range. A concrete example of the reagent handover process will be described with reference to FIG. 7.

Figure 7:
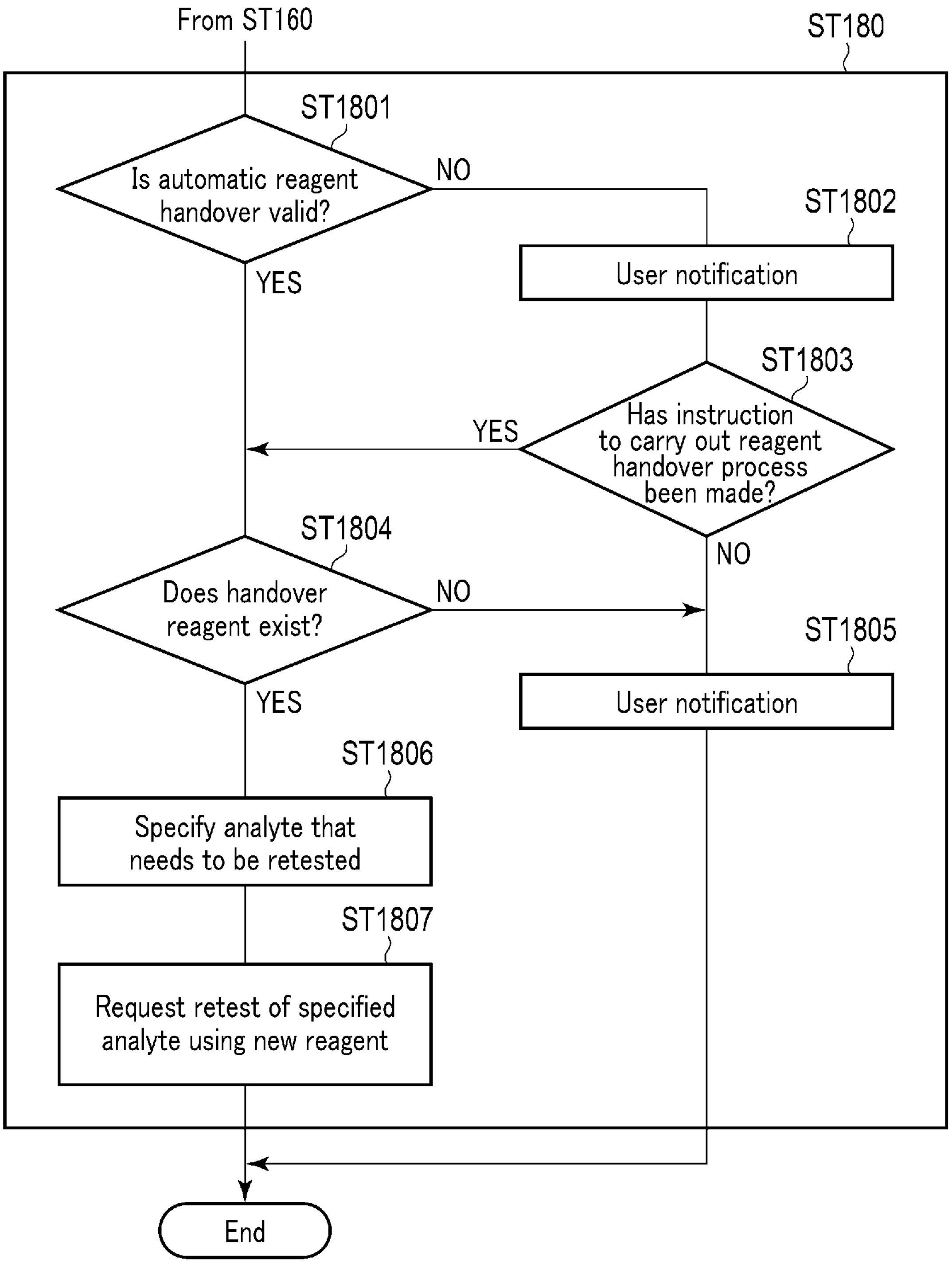
FIG. 7 is a flowchart showing exemplary processing steps in the reagent handover process included in the flowchart in FIG. 3.

FIG. 7 is a flowchart showing exemplary processing steps in the reagent handover process included in the flowchart in FIG. 3. The flowchart of FIG. 7 is started after it is determined at step ST160 in the flowchart of FIG. 3 that the measurement results are outside the acceptable range.

(Step ST1801)

Upon carrying out a reagent handover process, the control circuitry 9 with the determination function 93 determines whether or not automatic reagent handover is valid. It is assumed that the settings regarding the automatic reagent handover have been performed by the user in advance. If it is determined that the automatic reagent handover is valid, the process proceeds to step ST1804. If it is determined that the automatic reagent handover is not valid, the process proceeds to step ST1802.

(Step ST1802)

After determining that the automatic reagent handover is not valid, the control circuitry 9 with the notification function 95 inquires of the user as a user notification whether or not to carry out a reagent handover process. Here, the user gives an instruction as to whether or not to carry out the calibration measurement via, for example, the input interface 5.

(Step ST1803)

After the user notification, the control circuitry 9 with the determination function 93 determines whether or not an instruction to carry out a reagent handover process has been made. If it is determined that an instruction to carry out a reagent handover process has been made, the process proceeds to step ST1804. If it is determined that an instruction to carry out a reagent handover process has not been made, the process proceeds to step ST1805.

(Step ST1804)

After determining at step ST1801 that the automatic reagent handover is valid, or after determining at step ST1803 that an instruction to carry out a reagent handover process has been made, the control circuitry 9 with the determination function 93 determines whether or not a handover reagent exists. In this determination, a check is made as to, for example, whether or not a backup reagent corresponding to a reagent for a test of the current test item exists. If it is determined that a handover reagent exists, the process proceeds to step ST1806. If it is determined that a handover reagent does not exist, the process proceeds to step ST1805.

(Step ST1805)

After determining at step ST1803 that an instruction to carry out a reagent handover process has not been made, the control circuitry 9 with the notification function 95 makes a user notification that a reagent handover process is not to be carried out. Here, the control circuitry 9 may make a notification that the accuracy is not insured with the current calibration curve, or may inquire of the user whether or not to continue the test with the current calibration curve.

Also, after determining at step ST1804 that a handover reagent does not exist, the control circuitry 9 with the notification function 95 makes a user notification that a reagent handover process cannot be carried out. Here, the control circuitry 9 may make a notification that a backup reagent as a handover reagent is insufficient, may make a notification that the accuracy is not insured with the current calibration curve, or may inquire of the user whether or not to continue the test with the current calibration curve. Upon completing step ST1805, the automatic checking process is terminated.

(Step ST1806)

After determining at step ST1804 that a handover reagent exists, the control circuitry 9 with the specification function 94 specifies an analyte that needs to be retested. Specifically, the control circuitry 9 specifies an analyte for which computation has been performed with a calibration curve that has not yet been updated by the calibration measurement (i.e., a calibration curve stored prior to the calibration measurement) during a period from a start of the automatic checking process until the present time. Note that, at step ST1806, the control circuitry 9 with the notification function 95 may notify the user that a reagent handover has occurred.

(Step ST1807)

After specifying the analyte, the control circuitry 9 requests a retest of the specified analyte using a new reagent. Upon completing step ST1807, the automatic checking process is terminated. Note that, after step ST1807, the process may return to step ST1406, and a calibration measurement using a new reagent may be performed.

Note that the description of step ST180 has been given in relation to the reagent handover process, but this does not intend a limitation. For example, if a backup standard sample exists, a standard sample handover process may be performed at step ST180. Alternatively, at step ST180, both a reagent handover process and a standard sample handover process may be performed.

As described above, the automatic analyzing apparatus according to the embodiment is configured to: carry out a calibration measurement to prepare a calibration curve for a test item, and then carry out an accuracy management measurement to calculate an accuracy of the prepared calibration curve; determine whether or not the calculated accuracy is within an acceptable range; specify, if the calculated accuracy is within the acceptable range, an analyte for which the test item needs to be recomputed; and recompute the test item for the specified analyte using the prepared calibration curve.

With the above-described configuration, the automatic analyzing apparatus according to the embodiment is capable of performing recomputation for or retesting of the analyte according to the results of the calibration measurement, thereby reducing a burden on the user.

According to at least one embodiment in the foregoing description, it is possible to reduce a burden on the user.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An automatic analyzing apparatus comprising processing circuitry configured to:

carry out a calibration measurement to prepare a calibration curve for a test item, and then carry out an accuracy management measurement to calculate an accuracy of the prepared calibration curve;

determine whether or not the calculated accuracy is within an acceptable range;

specify, if the calculated accuracy is within the acceptable range, an analyte for which the test item needs to be recomputed; and recompute the test item of the specified analyte using the prepared calibration curve.

2. The automatic analyzing apparatus according to claim 1, wherein the processing circuitry is further configured to determine, based on a recomputation result obtained by recomputing the test item of the specified analyte, a computation result obtained prior to the recomputing, and an acceptable error, whether or not to adopt the recomputation result.

3. The automatic analyzing apparatus according to claim 2, wherein the processing circuitry is further configured to perform determination to adopt the recomputation result if an error between the recomputation result and the computation result is within a range of the acceptable error.

4. The automatic analyzing apparatus according to claim 3, wherein the processing circuitry is further configured to notify a user of information as to whether or not the error is within the range of the acceptable error.

5. The automatic analyzing apparatus according to claim 4, wherein the processing circuitry is further configured, if it is determined that the recomputation result is not to be adopted, to inquire of the user whether or not to adopt the recomputation result.

6. The automatic analyzing apparatus according to claim 1, wherein the processing circuitry is further configured to:

determine, if the calculated accuracy is outside the acceptable range, whether or not a backup reagent corresponding to a reagent for the test item exists; and specify, if the backup reagent exists, an analyte for which the test item needs to be recomputed.

7. The automatic analyzing apparatus according to claim 6, wherein the processing circuitry is further configured to notify a user of information as to whether or not the backup reagent exists.

8. The automatic analyzing apparatus according to claim 1, wherein the processing circuitry is further configured to:

determine, if the calculated accuracy is outside the acceptable range, whether or not a backup standard sample corresponding to a standard sample for the test item exists; and specify, if the backup standard sample exists, an analyte for which the test item needs to be recomputed.

9. The automatic analyzing apparatus according to claim 8, wherein the processing circuitry is further configured to notify a user of information as to whether or not the backup standard sample exists.

10. The automatic analyzing apparatus according to claim 1, wherein the calibration measurement and the accuracy management measurement are performed in parallel with measurement of the analyte.

11. The automatic analyzing apparatus according to claim 1, wherein the processing circuitry is further configured to carry out the calibration measurement in response to a lot change in at least one of a reagent and/or a standard sample.

12. The automatic analyzing apparatus according to claim 1, wherein the processing circuitry is further configured to carry out the calibration measurement in response to an expiration of a calibration curve that had been used immediately before the preparing of the calibration curve.

13. The automatic analyzing apparatus according to claim 1, wherein the acceptable range is user settable.

14. The automatic analyzing apparatus according to claim 1, wherein the specified analyte is an analyte for which the test item has been computed with a calibration curve previous to the prepared calibration curve.

* * * * *